(12) United States Patent
Fujioka et al.

(10) Patent No.: US 7,796,351 B2
(45) Date of Patent: Sep. 14, 2010

(54) OPTICAL AXIS TILTING DEVICE FOR LASER OPTICAL SYSTEM

(75) Inventors: Takayuki Fujioka, Itabashi-ku (JP); Shinsuke Kaneko, Itabashi-ku (JP); Junichi Kodaira, Itabashi-ku (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 142 days.

(21) Appl. No.: 12/291,602

(22) Filed: Nov. 12, 2008

(65) Prior Publication Data

US 2009/0128930 A1    May 21, 2009

(30) Foreign Application Priority Data

Nov. 16, 2007    (JP) .............................. 2007-297679

(51) Int. Cl.
*G02B 7/02*    (2006.01)

(52) U.S. Cl. .................................................... 359/822

(58) Field of Classification Search ................. 359/811, 359/819, 822, 350, 694–697; 356/5.01, 139.08, 356/139.1, 141.1; 348/208.7, 335, 345, 352, 348/357, 373, 374, E5.027; 250/203.1, 216, 250/236
See application file for complete search history.

(56) References Cited

U.S. PATENT DOCUMENTS 3,330,958 A * 7/1967 Kaisler et al. ................ 250/216
7,719,778 B2 * 5/2010 Kodaira ....................... 359/822

FOREIGN PATENT DOCUMENTS

JP    6-26861    2/1994
JP    2008-70196    3/2008

* cited by examiner

*Primary Examiner*—Loha Ben
(74) *Attorney, Agent, or Firm*—Chapman and Cutler LLP

(57) ABSTRACT

An optical axis tilting device for laser optical system is configured to include a lens barrel in which a laser optical system is disposed; a tilt frame provided with a tilt sensor, a tilt mechanism including a drive motor, a threaded shaft, a movable member, and a position detector; a leveling mechanism; a ball joint mechanism including a ball support portion in the lens barrel, a ball portion made of a magnetic material and supported between the ball support portion and the tilt frame, a conical recess formed in one of the ball support portion and the tilt frame, and a permanent magnet provided in the one of the ball support portion and the tilt frame; and a computing portion.

6 Claims, 6 Drawing Sheets

OPTICAL AXIS TILTING DEVICE FOR LASER OPTICAL SYSTEM

CROSS REFERENCE TO RELATED APPLICATION

The present application is based on and claims priority from Japanese Patent Application No. 2007-297679, filed on Nov. 16, 2007, the disclosure of which is hereby incorporated by reference in its entirety.

BACKGROUND OF THE INVENTION

1. Field of the Invention

The present invention relates to improvements and modifications in an optical axis tilting device for laser optical system with a ball joint mechanism.

2. Description of the Related Art

In the prior art, there has been a known rotary laser surveying machine including an optical axis tilting device for laser optical system to set inclination of a laser beam, for example. Such a known optical axis tilting device includes means to control amounts of tilt angle of the optical axis of the laser optical system relative to a horizontal or vertical direction, such as a threaded shaft as a delivery mechanism for delivering a connection portion between the laser optical system and provided with an encoder detecting a rotation rate of the shaft, or a drive motor rotating a threaded shaft and provided with an encoder.

For example, Japanese Laid-open Patent Application Publication No. Hei 6-26861 discloses such an optical axis titling device configured to tilt a laser optical system from horizontal and vertical positions by driving the delivery mechanism.

There is another type of an optical axis tilting device configured to set inclination of the optical axis of the laser optical system by tilting the laser optical system relative to a tilt sensor of the optical axis tilting device which is in a leveled state.

However, these prior art optical axis tilting devices for laser optical system have a problem that since precision of the tilt angle setting for the rotary laser surveying machine depends on precision of the delivery mechanism, a deviation in the tilt angle setting may occur due to accumulated errors and abrasion of a screw portion of the delivery mechanism arising from repetitive movement thereof, deformation of the screw portion over time, or the like. Accordingly, it is hard to maintain a desired tilt precision for the optical axis of the laser optical system.

In view of solving this problem, the applicant of the present invention developed an optical axis tilting device for laser optical system which achieves a desired precision of a set tilt angle relative to a horizontal or vertical direction of the optical axis of the laser optical system even with occurrence of such errors (disclosed in Japanese Laid-open Patent Application Publication No. 2008-70196).

This optical axis tilting device for laser optical system comprises a lens barrel in which a laser optical system is disposed, an optical axis of the laser optical system being a Z axis, an X axis and a Y axis being orthogonal to each other in a plane orthogonal to the Z axis; a tilt frame being tilted in at least one of an X-axis direction and a Y-axis direction and provided with a tilt sensor detecting a horizontal reference position; a tilt mechanism tilting the tilt frame relative to the lens barrel; and a leveling mechanism supporting the lens barrel tiltably and tilting the lens barrel to level the tilt frame so that the tilt sensor detects the horizontal reference position. Further, the tilt mechanism comprises a threaded shaft rotated by a drive motor, a movable member reciprocated by the shaft and engaging with the tilt frame to tilt it relative to the lens barrel, and a position detector detecting a position of the movable member. The optical axis tilting device is configured to compute a tilt angle of the tilt frame relative to the lens barrel according to the position of the movable member detected by the position detector.

Moreover, this optical axis tilting device further comprises a ball joint mechanism to tilt the tilt frame. Advantageously, the ball joint mechanism has a simple structure of a pivot shaft provided on an arm and a conical recess formed in the tilt frame.

This optical axis tilting device for laser optical system can maintain a desired tilt precision relative to a horizontal or vertical direction of the optical axis of the laser optical system even with the above-described errors due to the repetitive movement of the screw portion.

However, there still remain errors in set tilt angles which even this optical axis tilting device cannot eliminate. The inventors of the present invention have found out what causes the errors in tilt angles, that is, a several micron gap occurring partially between a spherical portion of the pivot shaft and an inner circumferential wall of the conical recess when the tilt frame is tilted.

SUMMARY OF THE INVENTION

In light of solving the above problem, the present invention aims to provide an optical axis tilting device for laser optical system which can eliminate errors in set tilt angles due to the ball joint mechanism.

According to one aspect of the present invention, an optical axis tilting device for laser optical system is configured to include: a lens barrel in which a laser optical system is disposed; a tilt frame with a Z axis coincident with an optical axis of the laser optical system and an X axis and a Y axis being orthogonal to each other in a plane orthogonal to the Z axis, and being tilted in at least one of an X-axis direction and a Y-axis direction and provided with a tilt sensor detecting a horizontal reference position; a tilt mechanism tilting the tilt frame relative to the lens barrel and comprising a drive motor, a threaded shaft rotated by the drive motor, a movable member reciprocated by the shaft and engaging with the tilt frame to tilt it relative to the lens barrel, and a position detector detecting a position of the movable member relative to the lens barrel; a leveling mechanism supporting the lens barrel tiltably, and tilting the lens barrel to level the tilt frame so that the tilt sensor detects the horizontal reference position; a ball joint mechanism allowing the tilt frame to be supported by the lens barrel and comprising a ball support portion in the lens barrel, a ball portion made of a magnetic material and supported between the ball support portion and the tilt frame, a conical recess formed in one of the ball support portion and the tilt frame and whose inner circumferential wall is relatively, rotatably made in contact with the ball portion, and a permanent magnet provided in the one of the ball support portion and the tilt frame in which the conical recess is formed, to attract the ball portion into the inner circumferential wall; and a computing portion computing a tilt angle of the tilt frame relative to the lens barrel according to the position of the movable member detected by the position detector.

In features of this aspect, the ball portion extends in a 45° direction relative to the optical axis on both of the X axis and the Y axis.

In other features of this aspect, the optical axis tilting device for laser optical system is configured to further include an arm on either of the lens barrel and the ball support portion.

In other features of this aspect, the optical axis tilting device for laser optical system is configured to further include a ball receive portion in the other of the tilt frame and the ball support portion in which the conical recess is not formed, and with which the ball portion is relatively, rotatably made in contact.

DETAILED DESCRIPTION OF THE PREFERRED EMBODIMENTS

Hereinafter, the optical axis tilting device for laser optical system according to an embodiment of the present invention will be described in detail with reference to the accompanying drawings.

Figure 1:
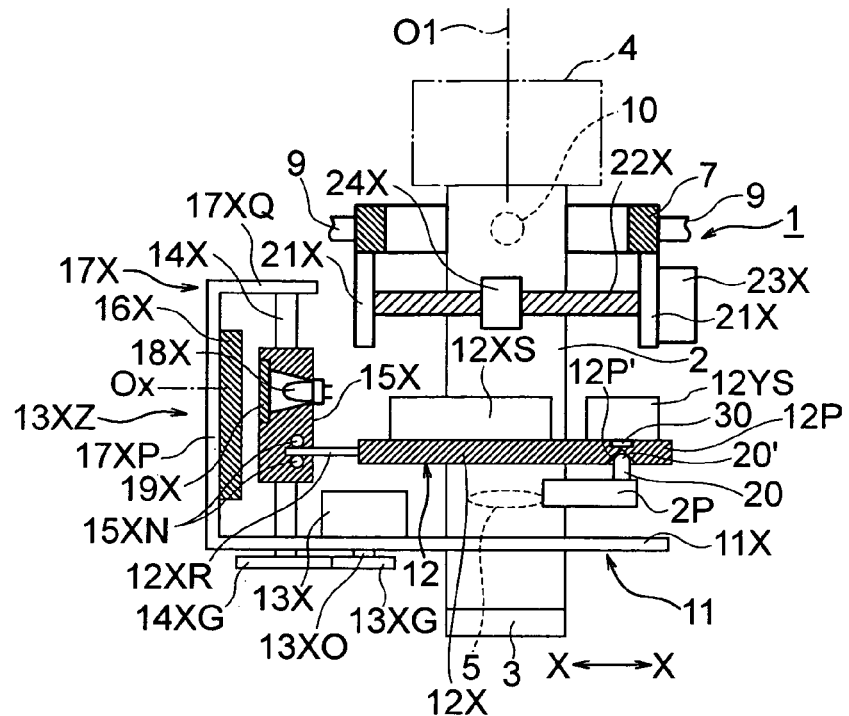
FIG. 1 is a schematic side view of a tilting mechanism of an optical axis tilting device for a laser optical system according to an embodiment of the present invention, seen from a negative side of a Y-axis.
Figure 2:
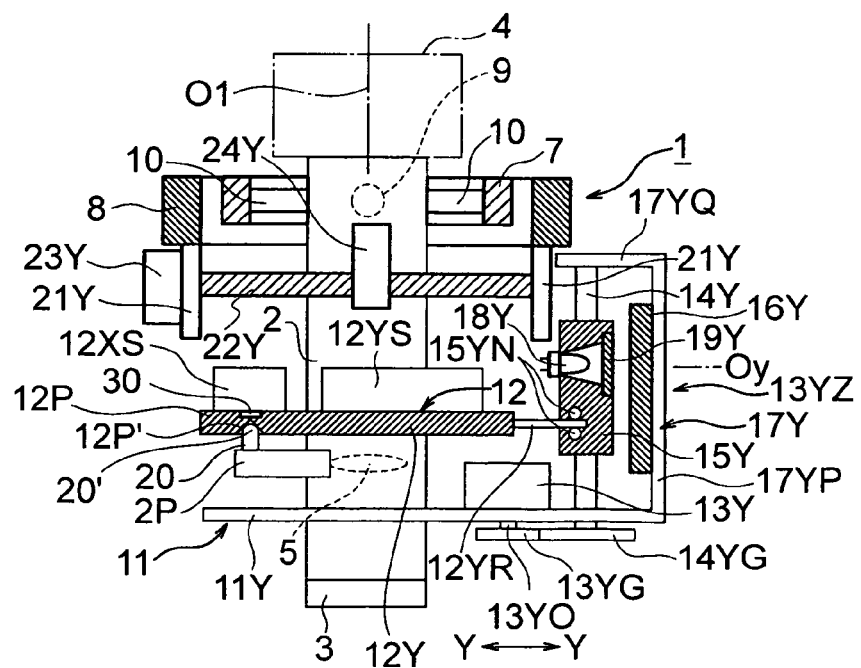
FIG. 2 is a schematic side view of the tilting mechanism of the optical axis tilting device for the laser optical system according to the embodiment of the present invention, seen from a positive side of an X-axis.
Figure 3:
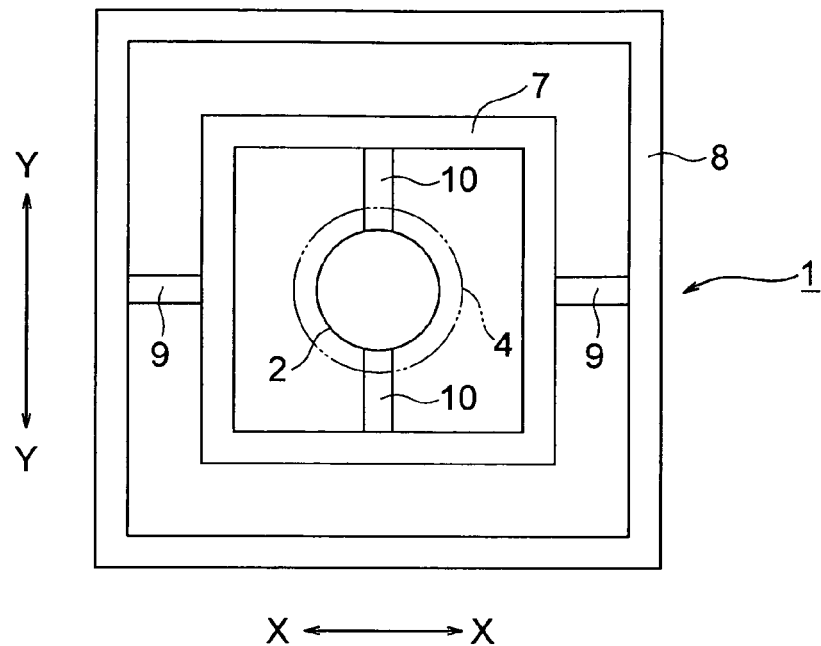
FIG. 3 is a schematic plain view of a gimbal mechanism in FIGS. 1 and 2.

In FIGS. 1 to 3, an optical axis tilting device for a laser optical system includes a gimbal mechanism 1 (leveling mechanism) and a lens barrel 2. A laser light source 3 is provided in the bottom of the lens barrel 2, and a rotary cylinder portion 4, for example, is provided in the top portion of the lens barrel 2. A lens 5 is disposed between the laser light source 3 and the rotary cylinder portion 4 inside the lens barrel 2. A pentaprism (not illustrated) is disposed inside the rotary cylinder portion 4. The laser optical system is substantially comprised of the laser light source 3 and the lens 5. A symbol O1 denotes an optical axis of the laser optical system. The optical axis O1 is defined to be Z-axis. X-axis and Y-axis are orthogonal to each other in a plane orthogonal to the Z axis. Note that the traveling direction of the light beam is to be a positive direction of the Z axis.

The lens 5 functions to convert light beams emitted from the laser light source 3 into parallel light beams, or to converge the light beams in a limited distance. The rotary cylinder portion 4 is driven by a rotary drive mechanism (not illustrated) to rotate around the optical axis O1 relative to the lens barrel 2. The light beams emitted from the laser light source 3 are deflected vertically relative to the optical axis O1 by the pentaprism and emitted in rotation to outside from a window (not illustrated) of the rotary cylinder portion 4.

The gimbal mechanism 1 has a rectangular gimbal frame 7 and a rectangular gimbal frame 8 outside of the gimbal frame 7, as illustrated in FIG. 2. The gimbal frame 8 is fixed to a housing of a not-shown rotary laser surveying machine.

The gimbal frame 8 has a pair of revolving shafts 9, 9 extending in an X-axis direction. The gimbal frame 7 is supported by the pair of revolving shafts 9, 9, and rotatable therearound. The gimbal frame 7 has a pair of revolving shafts 10, 10 extending along a Y-axis direction. The lens barrel 2 is supported by the pair of revolving shafts 10, 10, and rotatable therearound.

Figure 4:
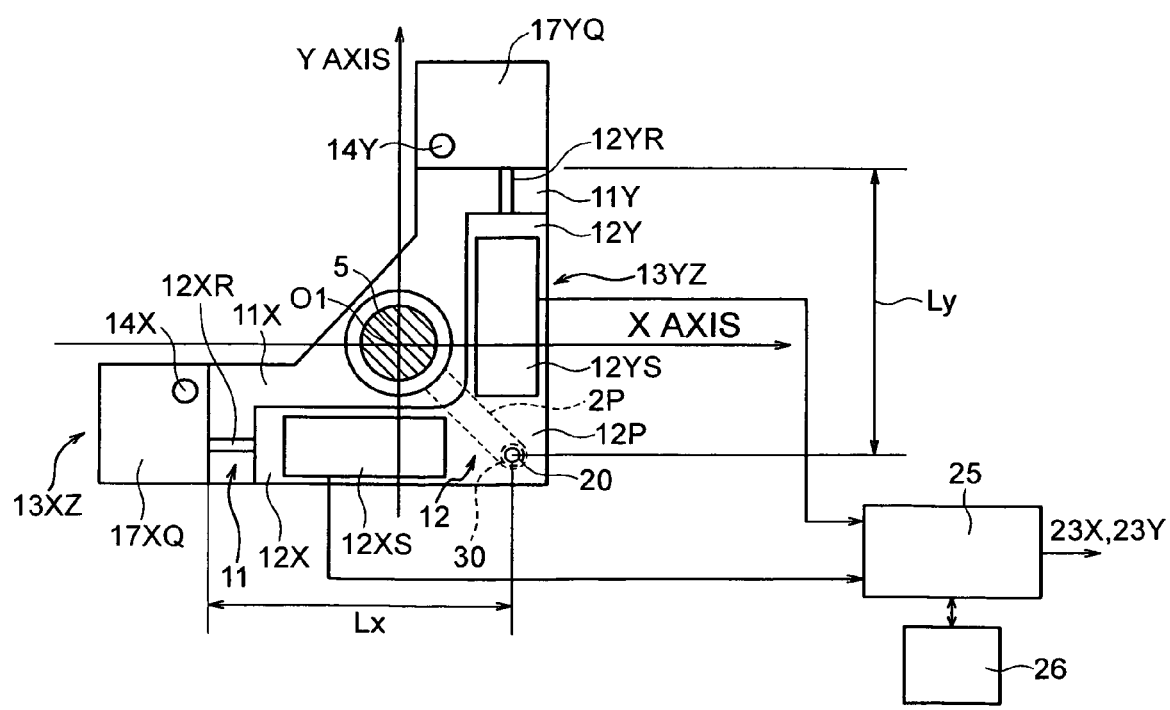
FIG. 4 is a plain view showing a relation among a tilt frame and a base plate and a lens barrel in FIGS. 1 and 2.

A base plate 11 is fixed to a lower portion of the lens barrel 2 vertically relative to the longitudinal direction of the lens barrel 2. As illustrated in FIG. 4, this base plate 11 includes an X-axis extending portion 11X extending in the X-axis direction, and a Y-axis extending portion 11Y extending in the Y-axis direction.

The X-axis extending portion 11X is provided with a first tilting mechanism 13XZ which relatively changes inclination of a later-described tilt frame 12 relative to the lens barrel 2 in the X-axis direction while the Y-axis extending portion 11Y is provided with a second tilting mechanism 13YZ which relatively changes inclination of the tilt frame 12 relative to the lens barrel 2 in the Y-axis direction.

As illustrated in FIG. 1, the first tilting mechanism 13XZ includes a motor 13X, a threaded shaft 14X rotating in association with rotation of a rotary axis of the motor 13X, a movable member 15X reciprocating in the Z-axis direction along with the rotation of the threaded shaft 14X, a CCD 16X as a position detection element detecting a position of the movable member 15X in the Z-axis direction, and a support frame 17X supporting the threaded shaft 14X. The support frame 17X has a longitudinal wall portion 17XP extending in the Z-axis direction, and a transversal wall portion 17XQ vertically extending to the lens barrel 2 from the top end of the longitudinal wall portion 17XP.

The threaded shaft 14X is rotatably supported by the transversal wall portion 17XQ and the X-axis extending portion 11X. The moving member 15X is screwed into the threaded shaft 14X. Both ends of the threaded shaft 14X are rotatably supported by the transversal wall portion 17XQ and X-axis extending portion 11X. The CCD 16X is fixed to the longitudinal wall portion 17XP to face the movable member 15X at its image receiving surface.

The motor 13X is fixed to the X-axis extending portion 11X, and a gear 13XG is provided around a rotation shaft 13XO of the motor 13X. A gear 14XG is provided around the bottom end of the threaded shaft 14X and is engaged with the gear 13XG.

The threaded shaft 14X is rotatably driven by the motor 13X, and the movable member 15X is driven in the Z-axis direction by rotation of the threaded shaft 14X.

The movable member 15X includes an LED 18X and a reference pattern plate 19X. The LED 18X transmissively illuminates the reference pattern plate 19X from the back side thereof to project an image of the pattern plate on the image receiving surface of the CCD 16X. A position of the movable member 15X is determined in the Z-axis direction based on the reference pattern image projected onto the image receiving surface of the CCD 16X.

As illustrated in FIG. 2, the second tilting mechanism 13YZ includes a motor 13Y, a threaded shaft 14Y rotating in association with rotation of a rotary axis of the motor 13Y, a movable member 15Y reciprocating in the Z-axis direction along with the rotation of the threaded shaft 14Y, a CCD 16Y as a position detection element detecting a position of the movable member 15Y in the Z-axis direction, and a support frame 17Y supporting the threaded shaft 14Y. The support frame 17Y has a longitudinal wall portion 17YP extending in the Z-axis direction, and a transversal wall portion 17YQ vertically extending to the lens barrel 2 from the top end of the longitudinal wall portion 17YP.

The threaded shaft 14Y is rotatably supported by the transversal wall portion 17YQ and the Y-axis extending portion 11Y. The moving member 15Y is screwed into the threaded shaft 14Y. The CCD 16Y is fixed to the longitudinal wall portion 17YP to face the movable member 15Y at its image receiving surface. Both ends of the threaded shaft 14Y are rotatably supported by the transversal wall portion 17YQ and Y-axis extending portion 11Y.

The motor 13Y is fixed to the Y-axis extending portion 11Y, and a gear 13YG is provided around a rotation shaft 13YO of the motor 13Y. A gear 14YG is provided around the bottom end of the threaded shaft 14X and is engaged with the gear 13YG.

The threaded shaft 14Y is rotatably driven by the motor 13Y, and the movable member 15Y is driven in the Z-axis direction by rotation of the threaded shaft 14Y.

The movable member 15Y includes an LED 18Y and a reference pattern plate 19Y. The LED 18Y transmissively illuminates the reference pattern plate 19Y from the back side thereof to project an image of the pattern plate 19Y on the image receiving surface of the CCD 16Y. A position of the movable member 15Y is determined in the Z-axis direction based on the reference pattern image projected onto the image receiving surface of the CCD 16Y.

As illustrated in FIG. 4, the tilt frame 12 is shaped substantially in an L-form and has an X-axis extending portion 12X and a Y-axis extending portion 12Y which are orthogonal to each other. The X-axis extending portion 12X comprises an X-axis tilt sensor 12XS detecting inclination in the X-axis direction while the Y-axis extending portion 12Y comprises a Y-axis tilt sensor 12YS detecting inclination in the Y-axis direction. The X-axis extending portion 12X comprises an engagement rod 12XR extending in the X-axis direction, and the Y-axis extending portion 12Y comprises an engagement rod 12YR extending in the Y-axis direction.

The movable member 15X includes a pair of engagement claws 15XN, 15XN arranged with an interval in the vertical direction (FIG. 1) to engage with the engagement rod 12XR. Likewise, the movable member 15Y includes a pair of engagement claws 15YN, 15YN arranged with an interval in the vertical direction to engage with the engagement rod 12YR (FIG. 2).

Further, the lens barrel 2 comprises an arm portion 2P (arm) extending to an intersection 12P of the X-axis extending portion 12X and the Y-axis extending portion 12Y in a 45° direction relative to the X-axis and the Y-axis. A pivot shaft 20 (ball support portion) is formed on one end of the arm portion 2P, extending in a positive Z-axis direction. A conical recess 12P' is formed in the intersection 12P of the tilt frame 12. The pivot shaft 20 includes a spherical portion 20' (ball portion) at one end as shown in the enlarged view of FIG. 6. The spherical portion 20' is configured to engage with the conical recess 12P' and relatively, rotatably make in contact with the inner circumferential wall 12P" thereof. The pivot shaft 20 is made of a magnetic material and a permanent magnet 30 is embedded in the intersection 12P above the peak of the conical recess 12P'. The permanent magnet 30 functions to attract the spherical portion 20' to the inner circumferential wall 12P". The arm portion 2P, pivot shaft 20, spherical portion 20', conical recess 12P', and permanent magnet 30 constitute the ball joint mechanism according to the present invention.

The tilt frame 12 is supported by the pivot shaft 20 and the two pairs of engagement claws 15XN, 15XN, 15YN, 15YN, and is configured to change inclination of the lens barrel 2 in the X-axis and Y-axis directions with the spherical portion 20' of the pivot shaft 20 as a supporting point.

The X-axis tilt sensor 12XS and the Y-axis tilt sensor 12YS are able to detect absolute horizontal reference positions. Detection signals therefrom are processed by a computing portion 25 shown in FIG. 4.

As illustrated in FIG. 1, the gimbal frame 7 comprises a pair of bearing members 21X, 21X disposed with an interval in the X-axis direction which rotatably support an X-axis threaded shaft 22X extending in the X-axis direction. One of the bearing members 21X, 21X has an X-axis motor 23X fixed thereto which rotates the X-axis threaded shaft 22X. The X-axis threaded shaft 22X is screwed with an X-axis movable member 24X which moves in the X-axis direction and is fixed to the periphery of the lens barrel 2.

As illustrated in FIG. 2, the gimbal frame 8 comprises a pair of bearing members 21Y, 21Y disposed with an interval in the Y-axis direction which rotatably support a Y-axis threaded shaft 22Y extending in the Y-axis direction. One of the bearing members 21Y, 21Y has a Y-axis motor 23Y fixed thereto which rotates the Y-axis threaded shaft 22Y. The Y-axis threaded shaft 22Y is screwed with a Y-axis movable member 24Y which moves in the Y-axis direction and is fixed to the periphery of the lens barrel 2.

Rotation of the X-axis motor 23X rotates the X-axis threaded shaft 22X, whereby the X-axis movable member 24X is transferred in the X-axis direction to tilt the lens barrel 2 relative to the rotary laser surveying machine body with the revolving shafts 10, 10 being supporting points. Similarly, rotation of the Y-axis motor 23Y rotates the Y-axis threaded shaft 22Y, whereby the Y-axis movable member 24Y is transferred in the Y-axis direction to tilt the lens barrel 2 relative to the rotary laser surveying machine body with the revolving shafts 9, 9 being supporting points.

During manufacturing process of the rotary laser surveying machine, the lens barrel 2 is set by a not-illustrated device so that the optical axis O1 thereof is to be in the vertical direction. In this state the tilt frame 12 is set to be horizontal by the tilting mechanisms 13XZ, 13YZ driven by the movable members 15X, 15Y, respectively. Detected positions of the reference pattern image corresponding to this horizontal position of the tilt fame 12 are defined to be original positions Ox, Oy. Image signals of the reference pattern image corresponding to the original positions Ox, Oy are stored in a memory unit 26 via the computing portion 25. In such a manner, a vertical relationship between the optical axis O1 and the tilt frame 12 is set during the manufacturing process.

With the vertical relationship between them maintained, the lens barrel 2 is set in the housing of the rotary laser surveying machine through the gimbal mechanism 1.

For setting the optical axis O1 of the laser optical system at a desired angle with respect to the horizontal plane, for example, the following operations are performed.

For example, to tilt the tilt frame 12 at a desired angle, the motors 13X, 13Y are driven by manipulation to a tilt angle setting button (not illustrated) to move the movable members 15X, 15Y. The computing portion 25 detects displacements $\Delta x$, $\Delta y$ of the movable members 15X, 15Y from the original positions Ox, Oy, based on the positions of the reference pattern image and the original positions stored in the memory unit 26.

Figure 5:
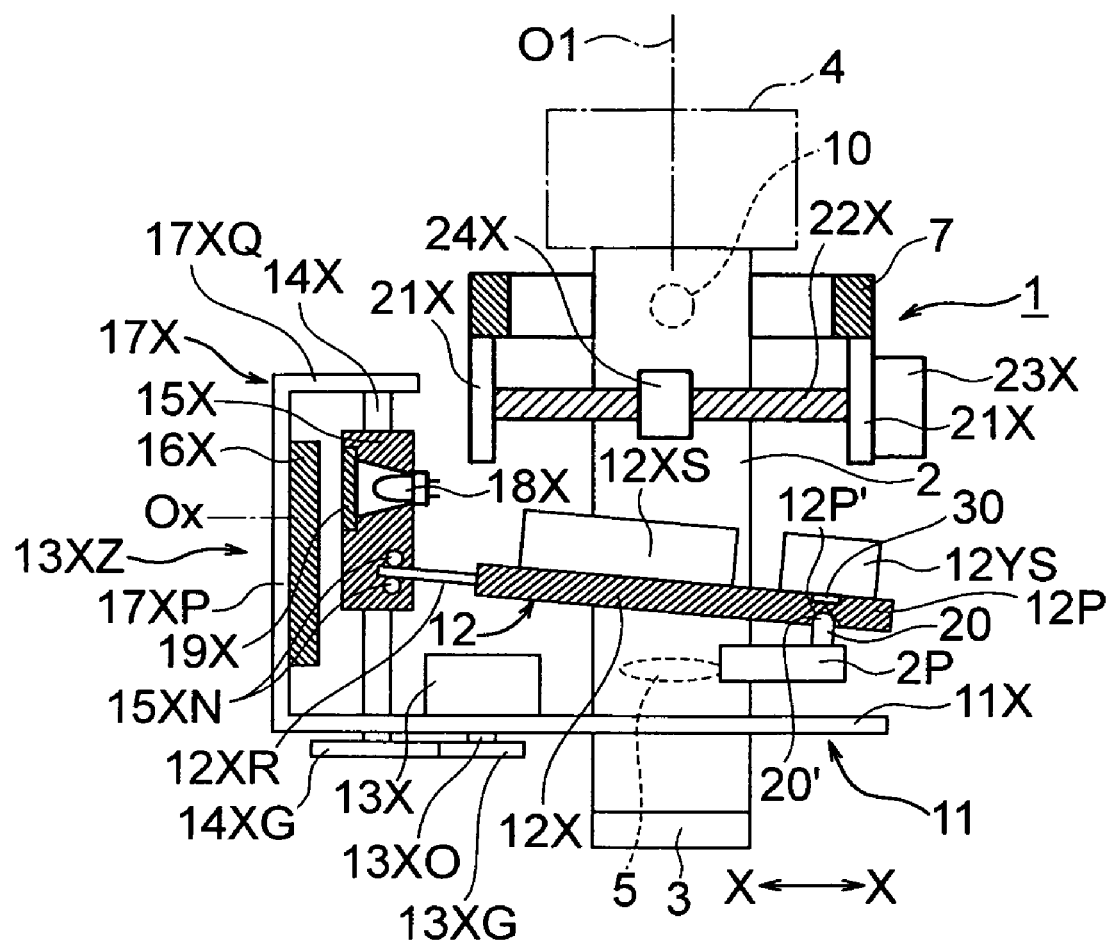
FIG. 5 is a cross section view showing tilting action of the optical axis tilting device for the laser optical system to change inclination in the X-axis direction according to the embodiment of the present invention.

The tilt angle θx of the tilt frame 12 in the X-axis direction and that θy in the Y-axis direction are computed by the computing portion 25 using the following formulas:

$$\theta x = \tan^{-1}(\Delta x/Lx)$$

$$\theta y = \tan^{-1}(\Delta y/Ly)$$

where Lx is a distance from the pivot shaft 20 to a front end of the engagement rod 12XR in the X-axis direction, and Ly is a distance from the pivot shaft 20 to a front end of the engagement rod 12YR in the Y-axis direction as illustrated in FIG. 4. These computed tilt angles θx, θy of the tilt frame 12 are, for example, displayed on a monitor screen (not illustrated). The movable members 15X, 15Y are moved by the manipulation to the tilt angle setting button until the tilt angles θx, θy of the tilt frame 12 reach desirable degrees, and they are stopped at the desired degrees. Thus, the tilt frame 12 is set to tilt at the tilt angles θx, θy with respect to the horizontal plane, as illustrated in FIG. 5.

The X-axis tilt sensor 12XS and the Y-axis tilt sensor 12YS output, to the computing portion 25, signals of output values in proportion to the tilt angles of the tilt frame 12 with respect to the horizontal plane. The computing portion 25 drives the X-axis motor 23X and the Y-axis motor 23Y so that their output values become 0.

Thus, the lens barrel 2 is tilted with the revolving shafts 10, 10 being axes and tilted with the revolving shafts 9, 9 being axes, to make the tilt frame 12 be horizontal.

As a result, the optical axis O1 of the laser optical system is tilted at θx degrees around the revolving shafts 10, 10 and at θy degrees around the revolving shafts 9, 9.

That is, the gimbal mechanism 1 functions as a leveling mechanism which levels (horizontally positions) the tilt frame 12 by changing at least one of the inclinations of the tilt frame 12 in the X-axis and Y-axis directions when the optical axis O1 is the Z-axis and the X-axis and Y-axis are orthogonal to each other in the plane orthogonal to the Z-axis.

According to the embodiment of the present invention, since actual positions of the movable members 15X, 15Y tilting the tilt frame 12 are detected, it is able to reliably maintain the precision of set tilt angles of the optical axis O1 of the laser optical system relative to the horizontal and vertical directions even with occurrence of wobbles of the delivery mechanism due to accumulated errors and abrasion of the screw portion arising from their repetitive movements, and deformation thereof over time.

Figure 6:
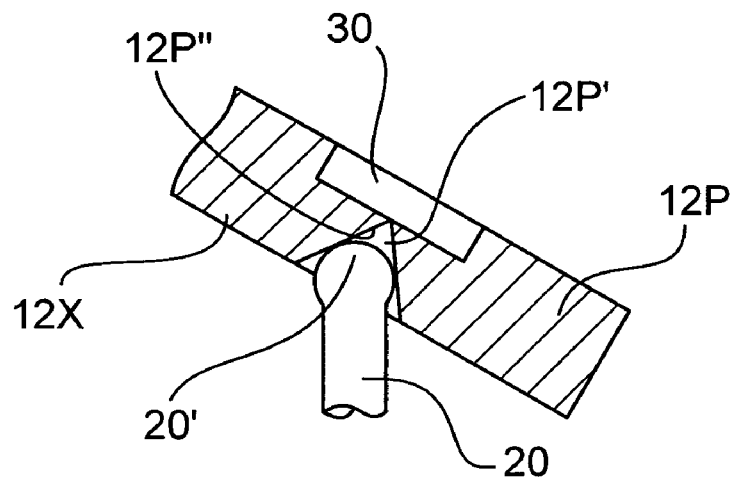
FIG. 6 is a partial enlarged view of a ball joint mechanism according to the present invention.
Figure 7:
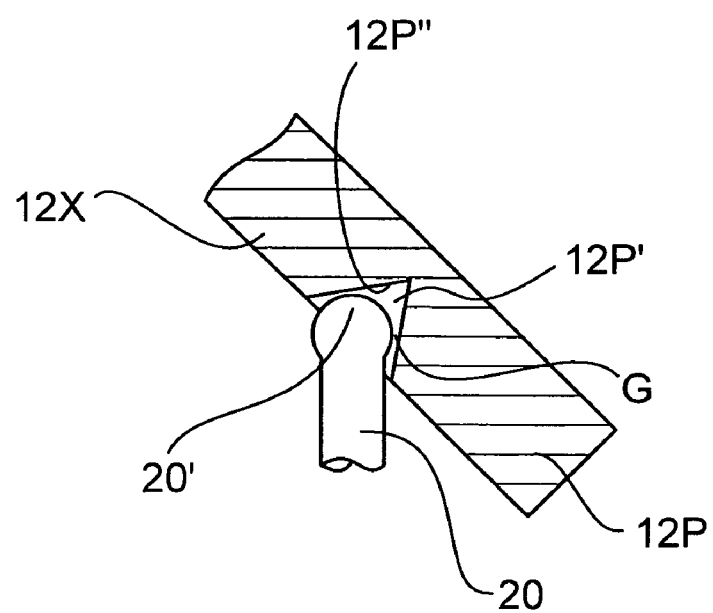
FIG. 7 is a partial enlarged view of a ball joint mechanism without a permanent magnet.

According to the present invention, with provision of the permanent magnet 30, occurrence of a gap between the spherical portion 20' and the inner circumferential wall 12P''' is preventable even while the tilt frame is tilted, since the spherical portion 20' is brought into close contact with the inner circumferential wall 12P''' by attraction of the permanent magnet 30, as illustrated in FIG. 6. Meanwhile, without the permanent magnet 30, a gap G in several μm will occur between the spherical portion 20' and inner circumferential wall 12P''' when the diameter of the spherical portion 20' is about 5 mm to 7 mm, for example, as illustrated in FIG. 7.

In the embodiment of the present invention above, the CCDs 16X, 16Y are used as position detection elements to detect the position of the reference pattern image. However, the present invention is not limited thereto. PSDs (Position Sensitive Detector) are also usable for position detection elements to detect the position of the reference pattern image.

Further, a resistance element (linear sensor) such as a slide volume is usable as a position detection element to detect the positions of the movable members 15X, 15Y.

Additionally, in the embodiment of the present invention, the optical axis tilting device is configured that the movable members 15X, 15Y comprise the reference pattern plates 19X, 19Y and the position detection elements (CCDs 16X, 16Y) is provided on the longitudinal wall portions 17XP, 17YP, respectively. However, it can be configured that the movable members 15X, 15Y comprise the position detection elements (CCDs 16X, 16Y) and the LEDs 18X, 18Y and the reference pattern plates 19X, 19Y are provided on the longitudinal wall portions 17XP, 17YP, respectively.

Moreover, in the embodiment of the present invention, the optical axis tilting device is configured that the tilt frame 12 is supported by the pivot shaft 20 and tiltable to change inclinations thereof in both of the X-axis and Y-axis directions with the spherical portion 20' of the pivot shaft 20 being the supporting point. However, it can be also configured that the tilt frame 12 is tiltable in either of the X-axis and Y-axis directions.

Furthermore, in the embodiment of the present invention, the pivot shaft 20 is provided on the arm 2P and the conical recess 12P' is provided in the intersection 12P of the tilt frame 12. However, it can be also configured oppositely that the recess 12P' is formed in the arm 2P and the pivot shaft 20 is provided on the intersection 12P of the tilt frame 12.

Figure 8:
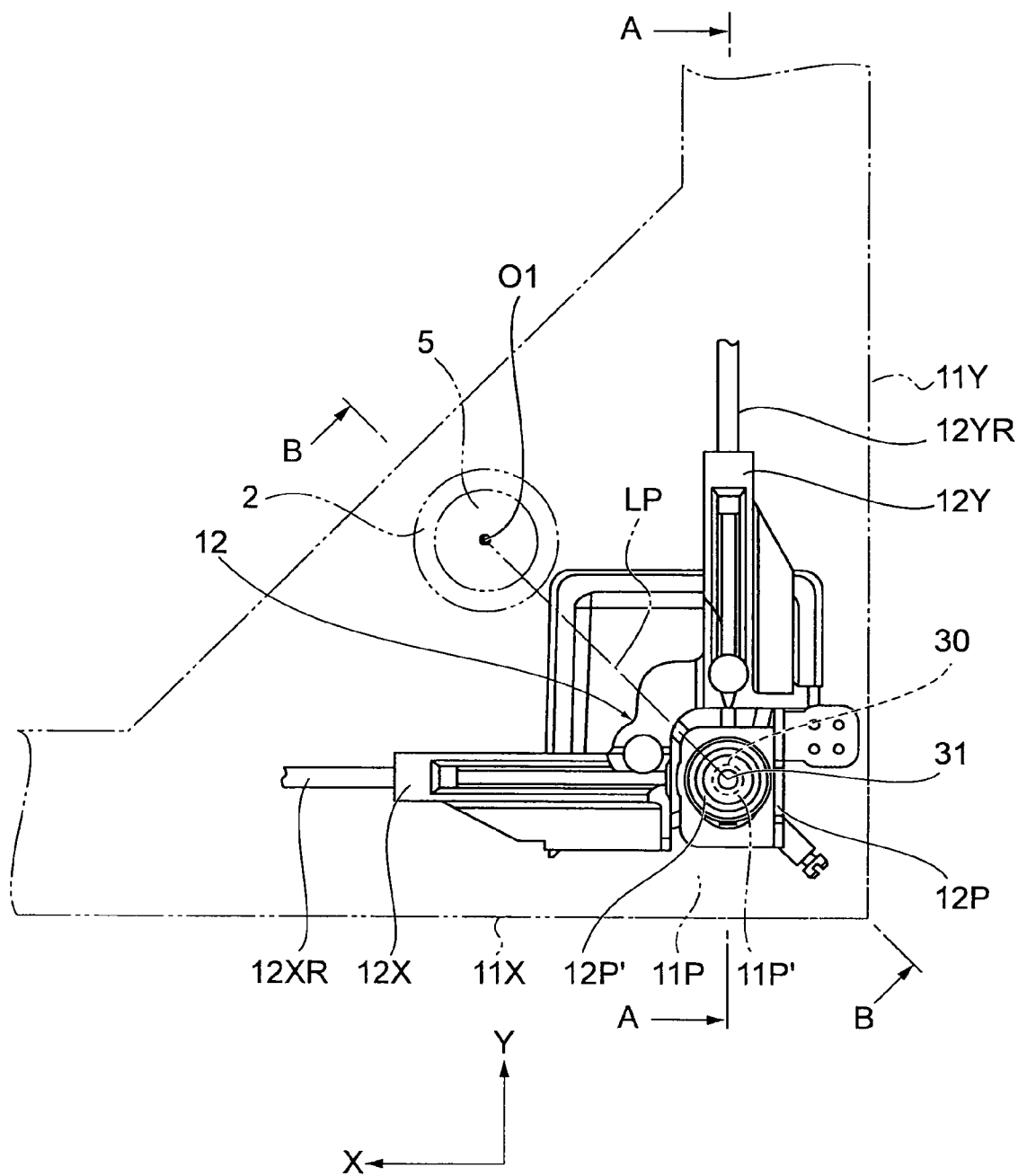
FIG. 8 shows another example of the ball joint mechanism according to the present invention and shows a positional relation between the tilt frame and the base plate.
Figure 10:
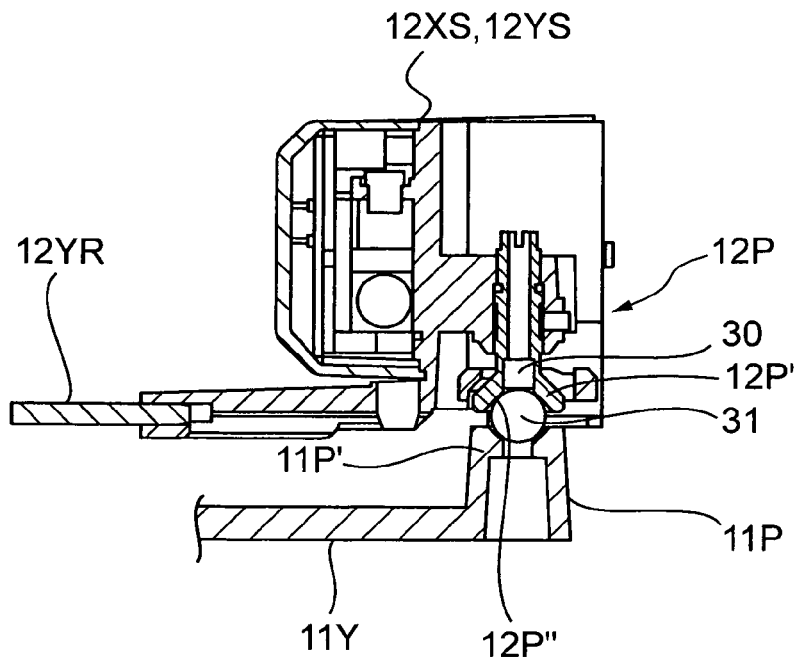
FIG. 10 is a partial cross section view of the ball joint mechanism according to the present invention taken along A to A line in FIG. 8.

In the embodiment of the present invention, the optical axis tilting device is configured that the pivot shaft 20 is provided on the arm 2P. However, it can be configured to include, as shown in FIG. 8 or 10, a ball bearing 11P' (ball support portion, ball receive portion) in the intersection 11P of the base plate 11 to relatively, rotatably support a ball 31 (ball portion) made of a magnetic material as well as to include in the intersection 12P of the tilt frame 12 the conical recess 12P' to place the permanent magnet 30 on the peak thereof. Thereby, the ball 31 is brought into close contact with the inner circumferential wall 12P''' of the recess by the permanent magnet 30 relatively, rotatably. It is preferable that a line segment LP (FIG. 8) between the center of the ball 31 and the optical axis O1 of the lens 5 (or lens barrel 2) is configured to extend in a 45° direction relative to the X and Y axes.

Figure 9:
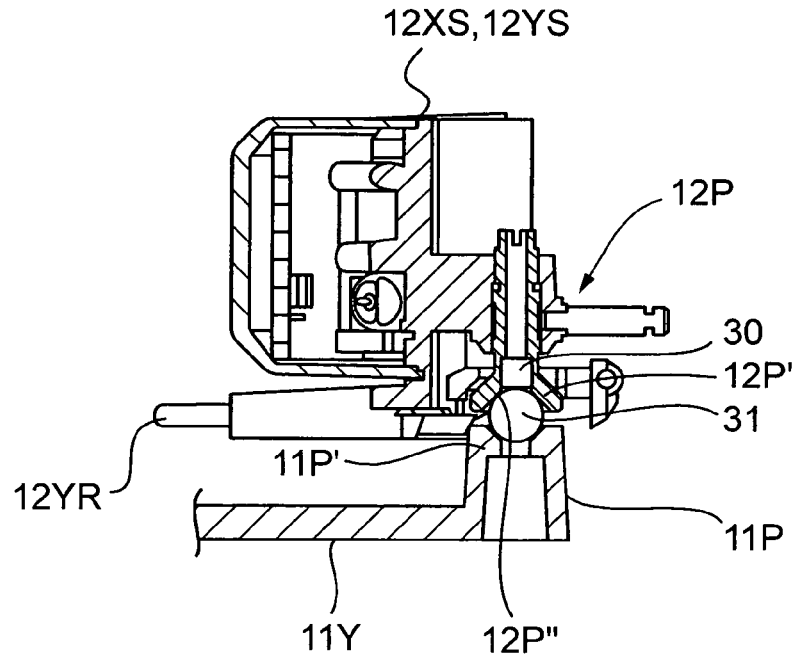
FIG. 9 is a partial cross section view of the ball joint mechanism according to the present invention taken along B to B line in FIG. 8.

Note that in FIGS. 8 to 10 the permanent magnet 30 appears to be in contact with the ball 31, however, there is a small gap between the two in reality.

In FIGS. 8 to 10, the tilt sensors 12XS, 12YS are contained in a case, however, they can be structured as illustrated in FIG. 4. The rest of the structure of the device body is substantially the same as that in FIG. 4 so that like components are given like numeral codes and detailed description thereon is omitted.

As described above, according to the present invention, the optical axis tilting device with a simple structure can advantageously eliminate errors in set tilt angles due to the ball joint mechanism.

Although the preferred embodiments of the present invention has been described in terms of exemplary embodiments, it should be noted that the present invention is not limited to these embodiments, various modifications and changes may be made to the embodiments by those skilled in the art without departing from the scope of the present invention as defined by the following claims.

What is claimed is:

1. An optical axis tilting device for a laser optical system comprising:
   a lens barrel in which a laser optical system is disposed;
   a tilt frame with a Z axis coincident with an optical axis of the laser optical system and an X axis and a Y axis being orthogonal to each other in a plane orthogonal to the Z axis, and being tilted in at least one of an X-axis direction and a Y-axis direction and provided with a tilt sensor detecting a horizontal reference position;
   a tilt mechanism tilting the tilt frame relative to the lens barrel and comprising a drive motor, a threaded shaft rotated by the drive motor, a movable member reciprocated by the shaft and engaging with the tilt frame to tilt the tilt frame relative to the lens barrel, and a position detector detecting a position of the movable member relative to the lens barrel;
   a leveling mechanism supporting the lens barrel tiltably, and tilting the lens barrel to level the tilt frame so that the tilt sensor detects the horizontal reference position;
   a ball joint mechanism allowing the tilt frame to be supported by the lens barrel and comprising
      a ball support portion in the lens barrel,
      a ball portion made of a magnetic material and supported between the ball support portion and the tilt frame,
      a conical recess formed in a first one of the ball support portion and the tilt frame, with an inner circumferential wall of said conical recess being relatively and rotatably in contact with the ball portion, and
      a permanent magnet provided in said first one of the ball support portion and the tilt frame in which the conical recess is formed, to attract the ball portion into the inner circumferential wall; and
   a computing portion computing a tilt angle of the tilt frame relative to the lens barrel according to the position of the movable member detected by the position detector.

2. An optical axis tilting device for a laser optical system according to claim 1, wherein
   the ball portion extends in a 45° direction relative to the optical axis on both of the X axis and the Y axis.

3. An optical axis tilting device for a laser optical system according to claim 1, further comprising an arm on either of the lens barrel and the ball support portion.

4. An optical axis tilting device for a laser optical system according to claim 1, further comprising
   a ball receiving portion in a second one of the tilt frame and the ball support portion in which the conical recess is not formed, and with which the ball portion is relatively and rotatably in contact.

5. An optical axis tilting device for a laser optical system according to claim 2, further comprising
   a ball receiving portion in a second one of the tilt frame and the ball Support portion in which the conical recess is not formed, and with which the ball portion is relatively and rotatably in contact.

6. An optical axis tilting device for a laser optical system according to claim 3, further comprising
   a ball receiving portion in a second one of the tilt frame and the ball Support portion in which the conical recess is not formed, and with which the ball portion is relatively and rotatably in contact.

* * * * *